United States Patent
Watanabe et al.

(10) Patent No.: US 7,343,448 B2
(45) Date of Patent: Mar. 11, 2008

(54) STORAGE SYSTEM HAVING DECENTRALIZED CACHE CONTROLLING DEVICE AND DISK CONTROLLING DEVICE, STORAGE CONTROL PROGRAM, AND METHOD OF STORAGE CONTROL

(75) Inventors: Takashi Watanabe, Kawasaki (JP); Kazuichi Ooe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 10/871,002

(22) Filed: Jun. 21, 2004

(65) Prior Publication Data

US 2004/0225714 A1    Nov. 11, 2004

Related U.S. Application Data

(63) Continuation of application No. PCT/JP02/00595, filed on Jan. 28, 2002.

(51) Int. Cl.
*G06F 12/08* (2006.01)
(52) U.S. Cl. .................. 711/113; 709/218; 709/203
(58) Field of Classification Search .............. None
See application file for complete search history.

(56) References Cited

U.S. PATENT DOCUMENTS

| | | | |
|---|---|---|---|
| 4,363,095 A * | 12/1982 | Woods et al. ............. 711/206 |
| 6,098,128 A * | 8/2000 | Velez-McCaskey et al. .. 710/65 |
| 6,748,540 B1 * | 6/2004 | Canestaro et al. ............ 726/26 |
| 6,993,524 B1 * | 1/2006 | Watanabe et al. .............. 707/9 |
| 2002/0004917 A1 | 1/2002 | Malcolm et al. |
| 2004/0225714 A1 * | 11/2004 | Watanabe et al. ........... 709/203 |

FOREIGN PATENT DOCUMENTS

| | | |
|---|---|---|
| JP | 05-274210 | 10/1993 |
| JP | 11-073361 | 3/1999 |
| JP | 2000-089996 | 3/2000 |
| JP | 2001-290787 | 10/2001 |
| JP | 2001-356956 A | 12/2001 |
| JP | 2002-007304 | 1/2002 |
| WO | WO 01/95113 | 12/2001 |

OTHER PUBLICATIONS

European Search Report, mailed Mar. 12, 2007 and issued in corresponding European Patent Application No. 02716413.6-2201.

* cited by examiner

*Primary Examiner*—B. James Peikari
(74) *Attorney, Agent, or Firm*—Staas & Halsey LLP

(57) ABSTRACT

A storage system includes a cache device that has a cache memory as a high-speed-access storage medium, a disk device that has a disk as a high-capacity storage medium, and a control device that accepts an access request from a client device and makes the cache device and the disk device execute a process corresponding to the access request. The cache device, the disk device, and the control device are decentralized on a network.

8 Claims, 16 Drawing Sheets

FIG.4

| STORAGE ID RANGE | ACTUAL DISK RANGE (NODE ID, DISK ID, DISK RANGE) | CHACHE RANGE (NODE ID, MEMORY RANGE) |
|---|---|---|
| 0-99 | D0,2,0-99 | C0,0-99 |
| 100-199 | D1,1,0-99 | C1,0-99 |
| 200-299 | D0,1,0-99 | C0,100-199 |
| 300-399 | D0,2,100-199 | NO DATA |

STORAGE SYSTEM HAVING DECENTRALIZED CACHE CONTROLLING DEVICE AND DISK CONTROLLING DEVICE, STORAGE CONTROL PROGRAM, AND METHOD OF STORAGE CONTROL

This application is a continuing application, filed under 35 U.S.C. §111(a), of International Application PCT/JP02/00595, filed Jan. 28, 2002.

BACKGROUND OF THE INVENTION

1) Field of the Invention

The present invention relates to a technique of storing data.

2) Description of the Related Art

FIG. 16 is a block diagram of a configuration of a conventional storage device. Each of client devices $10_1$ to $10_n$ shown in the figure is a computer terminal that has an access, via a network 20, to a storage device 30, and performs processes such as reading of a data from the storage device 30 and writing of a data to the storage device 30.

The storage device 30 is a device that includes a disk 34 and a cache memory 37 as storage media, and stores large volumes of data. A network interface card 31 in the storage device 30 controls a communication with the client devices $10_1$ to $10_n$ in accordance with a predetermined communication protocol. A network driver 32 controls the network interface card 31.

The disk 34 is a storage medium that has characteristics of having a higher capacity and of being slower in terms of an access time in comparison to the cache memory 37. A disk driver 35 controls the disk 34. A disk controlling unit 36 executes read/write control of a data at the disk 34, and RAID (Redundant Array of Independent Disks) control of the disk 34. The RAID control means a control to enhance reliability and process speed by using more than one disk 34 simultaneously as one disk.

The cache memory 37 is, for example, an SRAM (Static Random Access Memory), and has characteristics of taking shorter access time but of having a smaller capacity than the disk 34.

The cache memory 37 stores a part of a data that is stored in the disk 34. A cache controlling unit 38 controls an access to the cache memory 37. A protocol processing unit 33 controls each part corresponding to a read/write request from the client devices $10_1$ to $10_n$.

When a read request is received from, for example, the client device $10_1$, the cache controlling unit 38 determines whether the data that is requested to be read is stored in the cache memory 37. If the data is present in the cache memory 37 (a cache hit), the cache controlling unit 38 reads the data from the cache memory 37 and passes the data to the client device $10_1$.

On the other hand, if there is no cache hit, the disk controlling unit 36 reads the data from the disk 34 through the disk driver 35, and passes the data to the client device $10_1$. Thus, when the data is read from the disk 34, the access time is longer than a case when the data is read from the cache memory 37.

When a write request is received from, for example, the client device $10_1$, the disk controlling unit 36 writes the data requested to be written to the disk 34 through the disk driver 35 and also passes the data to the cache controlling unit 38. The cache controlling unit 38 writes the data to the cache memory 37 so that the same data is written to both the cache memory 37 and the disk 34.

When writing the data, if there is no sufficient memory area in the cache memory 37, the cache controlling unit 38 prepares an area by erasing some data in the cache memory 37, and then writes the data in the area prepared.

In the conventional storage device 30, only one node bears all functions such as control of the disk 34 and the cache memory 37.

The disk 34 has a characteristic of performance that a random access speed is slow. Consequently, performance of the conventional storage device 30 degrades unless there is a cache hit in the cache memory 37. On the other hand, the performance of the network 20 has been improving day-by-day; therefore, the performance of the storage device 30 has been a bottleneck of a whole system not only in the random access, but also in a sequential access.

For example, the performance of the disk 34 is about 50 megabyte (MB)/s to 80 MB/s in the sequential access, but is not even 10 MB/s in the random access. Moreover, an average seek time of the disk 34 is about 4 milliseconds (ms).

Whereas, the network 20 can give a high performance such as a bandwidth of 120 MB/s and a response time of 100 microseconds (μs) to 200 μs. If an accelerating technology such as a high-speed interconnect is applied, both the bandwidth and the response time can be improved by an order of magnitude. Thus, it is clear that the capability of the storage device 30 is lower than the capability of the network 20.

Moreover, the storage device 30 can give full performance only when a data to be accessed is present in the cache memory 37, in other words, when there is a cache hit. A cache hit rate depends heavily on a memory size of the cache memory 37. Therefore, the larger the memory size of the cache memory 37 is, the higher the cache hit rate and the better the performance of the storage device 30 becomes.

However, in the conventional storage device 30 the memory size of the cache memory 37 is limited, because, only one node bears all functions such as control of the disk 34 and the cache memory 37. Moreover, memory area usable for the cache control obviously becomes limited, because, the conventional storage device 30 consumes memory area in the cache memory 37 for control other than the cache control.

Consequently, there is a problem that the bottleneck (lowering of the access speed to a data) in a system exists because the memory area in the cache memory 37 that is necessary for improvement of the performance is limited.

SUMMARY OF THE INVENTION

It is an object of the present invention to solve at least the problems in the conventional technology.

A storage system according to an aspect of the present invention includes a cache device that has a cache memory as a high-speed-access storage medium; a disk device that has a disk as a high-capacity storage medium; and a control device that accepts an access request from a client device and makes the cache device and the disk device execute a process corresponding to the access request. The cache device, the disk device, and the control device are prepared decentrally on a network.

A storage control program according to another aspect of the present invention is executed on a storage system, the storage system includes a cache device that has a cache memory as a high-speed-access storage medium, and a disk device that has a disk as a high-capacity storage medium that are prepared decentrally on a network. The storage control program makes a computer realize accepting an access request from a client device; creating a control data that makes the cache device and the disk device execute a process corresponding to the access request; and transmitting the control data to any one of the cache device and the disk device.

A storage control method according to still another aspect of the present invention is performed on a storage system, the storage system includes a cache device that has a cache memory as a high-speed-access storage medium, and a disk device that has a disk as a high-capacity storage medium that are prepared decentrally on a network. The method includes accepting an access request from a client device; creating a control data that makes the cache device and the disk device execute a process corresponding to the access request; and transmitting the control data to any one of the cache device and the disk device.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example of contents of a cache/actual disk controlling table 206 used in the embodiment;

DETAILED DESCRIPTION

Figure 1:
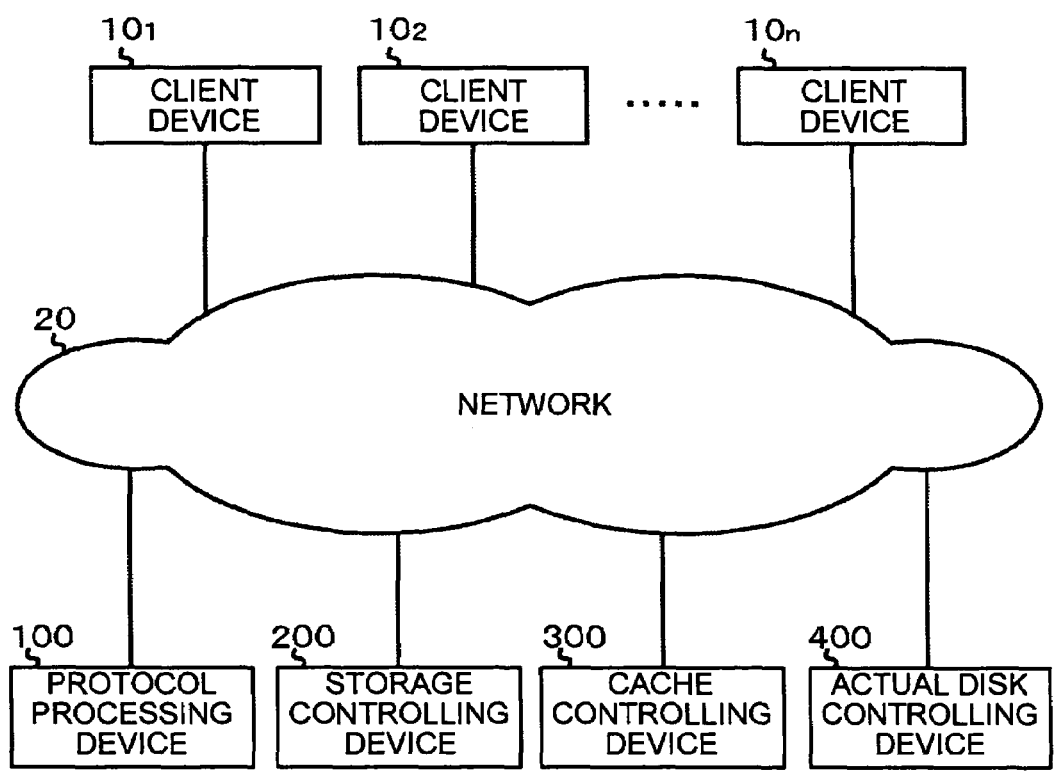
FIG. 1 is a block diagram of a configuration of an embodiment according to the present invention.
Figure 16:
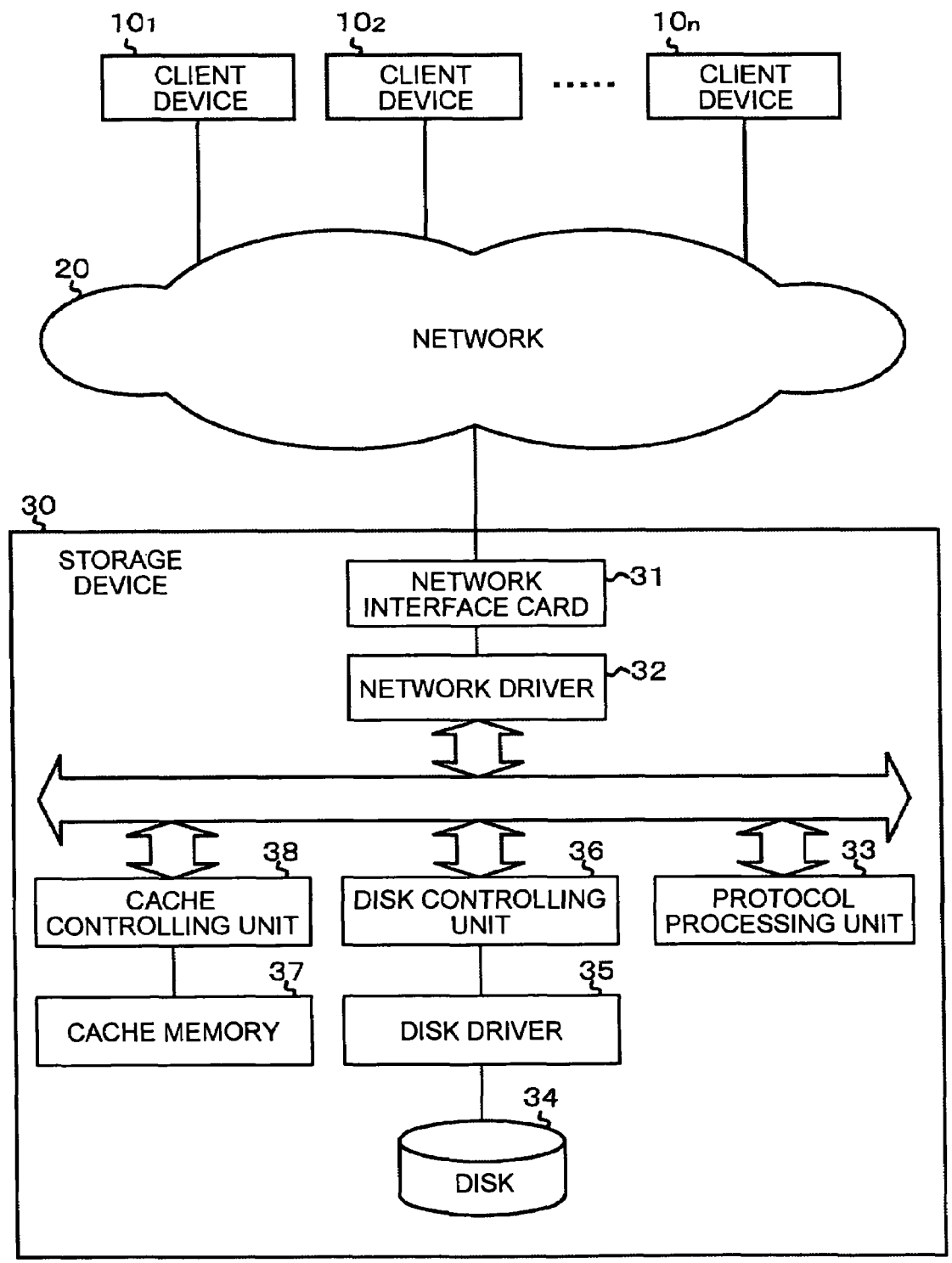
FIG. 16 is a block diagram of a configuration of a conventional storage device 30.

Exemplary embodiments according to the present invention are explained in detail below with reference to drawings. FIG. 1 is a block diagram of a configuration of the embodiment according to the present invention. In this diagram, identical reference numbers are given to parts that correspond to the parts shown in FIG. 16. As shown in the diagram, a protocol processing device 100, a storage controlling device 200, a cache controlling device 300, and an actual disk controlling device 400 are connected to a network 20 instead of the storage device 30 shown in FIG. 16. The protocol processing device 100, the storage controlling device 200, the cache controlling device 300, and the actual disk controlling device 400 configure a storage system.

The protocol processing device 100 has functions of receiving a read/write request from one of the client devices $10_1$ to $10_n$, and requesting the storage controlling device 200, which is at subsequent stage, to process the request.

Figure 2:
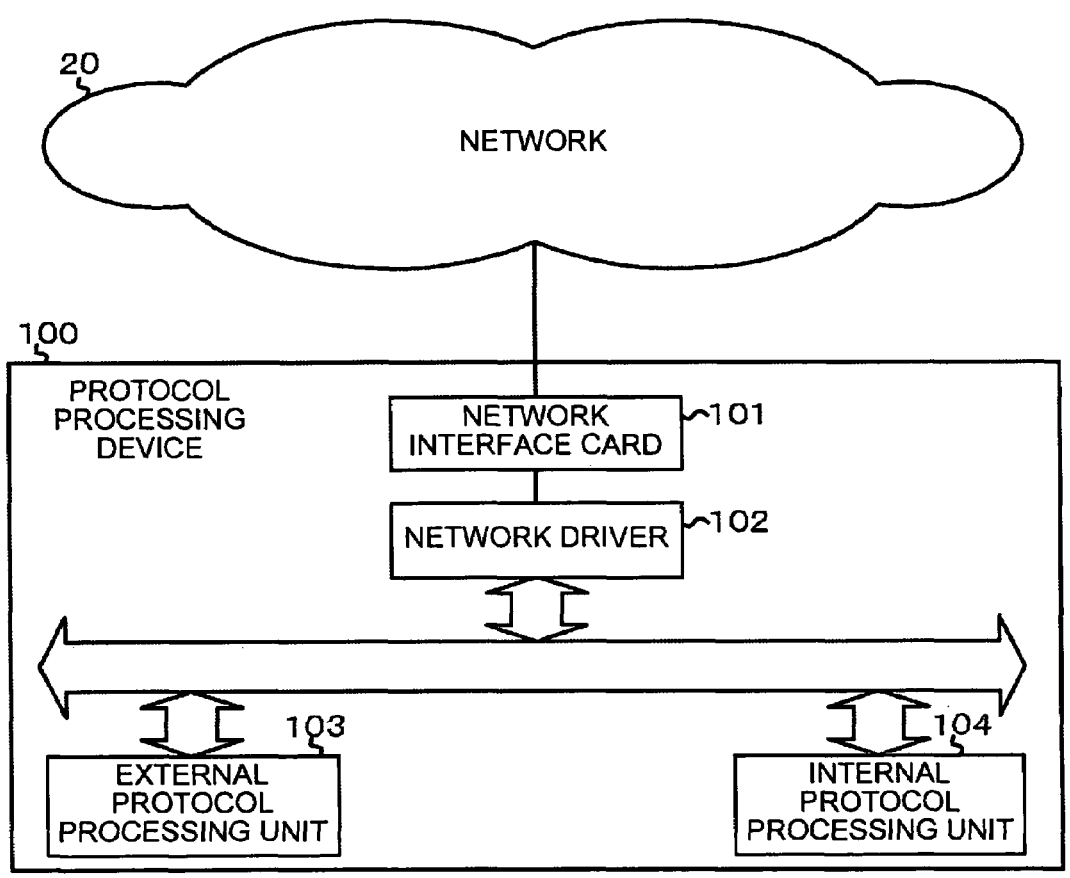
FIG. 2 is a block diagram of a configuration of a protocol processing device 100 shown in FIG. 1.

FIG. 2 is a detailed block diagram of the protocol processing device 100. The protocol processing device 100 includes a network interface card 101 that controls a communication with the client devices $10_1$ to $10_n$ and the storage controlling unit 200 in accordance with a predetermined communication protocol, and a network driver 102 that drive controls the network interface card 101.

Figure 7A:
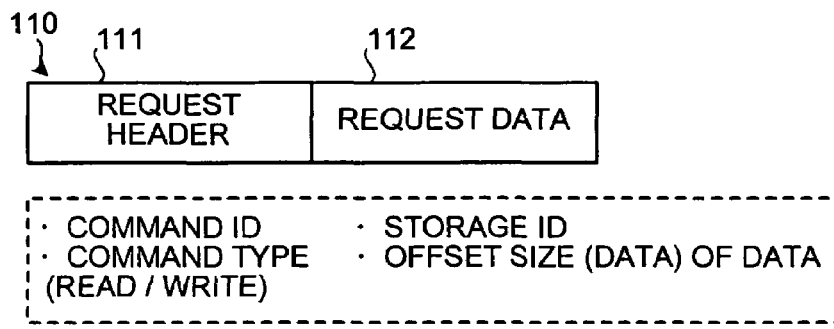
FIG. 7A is an example of data received by an external protocol processing unit shown in FIG. 2.

Moreover, the protocol processing device 100 includes an external protocol processing unit 103 that has a function of receiving a data 110 shown in FIG. 7A from one of the client devices $10_1$ to $10_n$. As shown in FIG. 7A, the data 110 includes a request header 111 and a request data 112.

The request header 111 includes data relating to a command ID to identify a command (read command/write command) and a command type. On the other hand, the request data 112 includes data relating to a storage ID that indicates a data storage position. When the command is a read command, the request data 112 also includes data relating to an offset size of the read data. On the other hand, when the command is a write command, the request data 112 includes data relating to an offset size of the write data, and the write data itself.

Figure 7B:
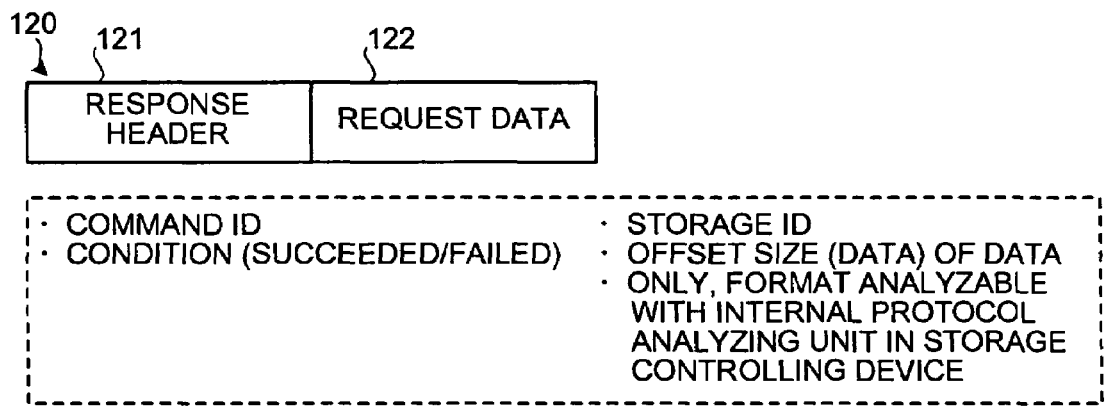
FIG. 7B is an example of data created by the external protocol processing unit.

The external protocol processing unit 103 has functions of creating a data 120 shown in FIG. 7B and passing the data to an internal protocol processing unit 104. The data 120 includes a response header 121 and a request data 122.

The response header 121 is a header format to respond to an origin of the read/write request (one of the client devices $10_1$ to $10_n$) about an operating condition (succeeded or failed) of the command and the like. The response header 121 includes a command ID and data relating to the operating condition (succeeded or failed) of the command, and is stored in the cache controlling device 300 and the actual disk controlling device 400.

The request data 122 includes data (a storage ID, and an offset size of the data (the data itself)) in a format that can be analyzed by a protocol analyzing unit 203 (refer to FIG. 3) in the storage controlling device 200.

Figure 7C:
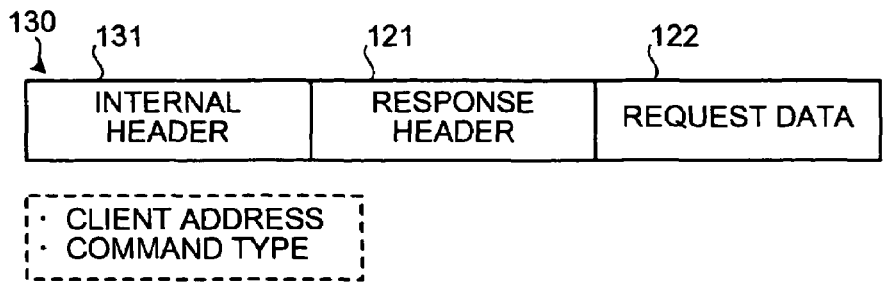
FIG. 7C is an example of data created by an internal protocol processing unit 104 shown in FIG. 2.

Referring to FIG. 2 again, the internal protocol processing unit 104 has functions of receiving the data 120 (refer to FIG. 7B) from the external protocol processing unit 103 and creating a data 130 shown in FIG. 7C, and transmitting the data 130 to the storage controlling device 200, which is in the subsequent stage.

The data 130 includes an internal header 131, the response header 121 (refer to FIG. 7B), and the request data 122 (refer to FIG. 7B). The internal header 131 includes data relating to an address of an origin of the read/write request (one of the client devices $10_1$ to $10_n$) and a command type (read/write command).

Referring to FIG. 1, the storage controlling device 200 has functions of receiving the data 130 (refer to FIG. 7C) from the protocol processing device 100, and searching a data position in the actual disk controlling device 400 based on the data 130 and a cache/actual disk controlling table 206 shown in FIG. 4.

The cache/actual disk controlling table 206 shown in FIG. 4 is a table that indicates a relationship of a storage ID range, an actual disk range, and a cache range. The storage ID range is a range of the storage ID described previously. The actual disk range is a range of a data position in the actual disk controlling device 400 (refer to FIG. 6), and includes data of a node ID, a disk ID, and the disk range.

The node ID is an identifier to identify the node in the actual disk controlling device 400. The disk ID is an identifier to identify the disk 404. The disk range is a range of the data position in the disk 404.

Figure 5:
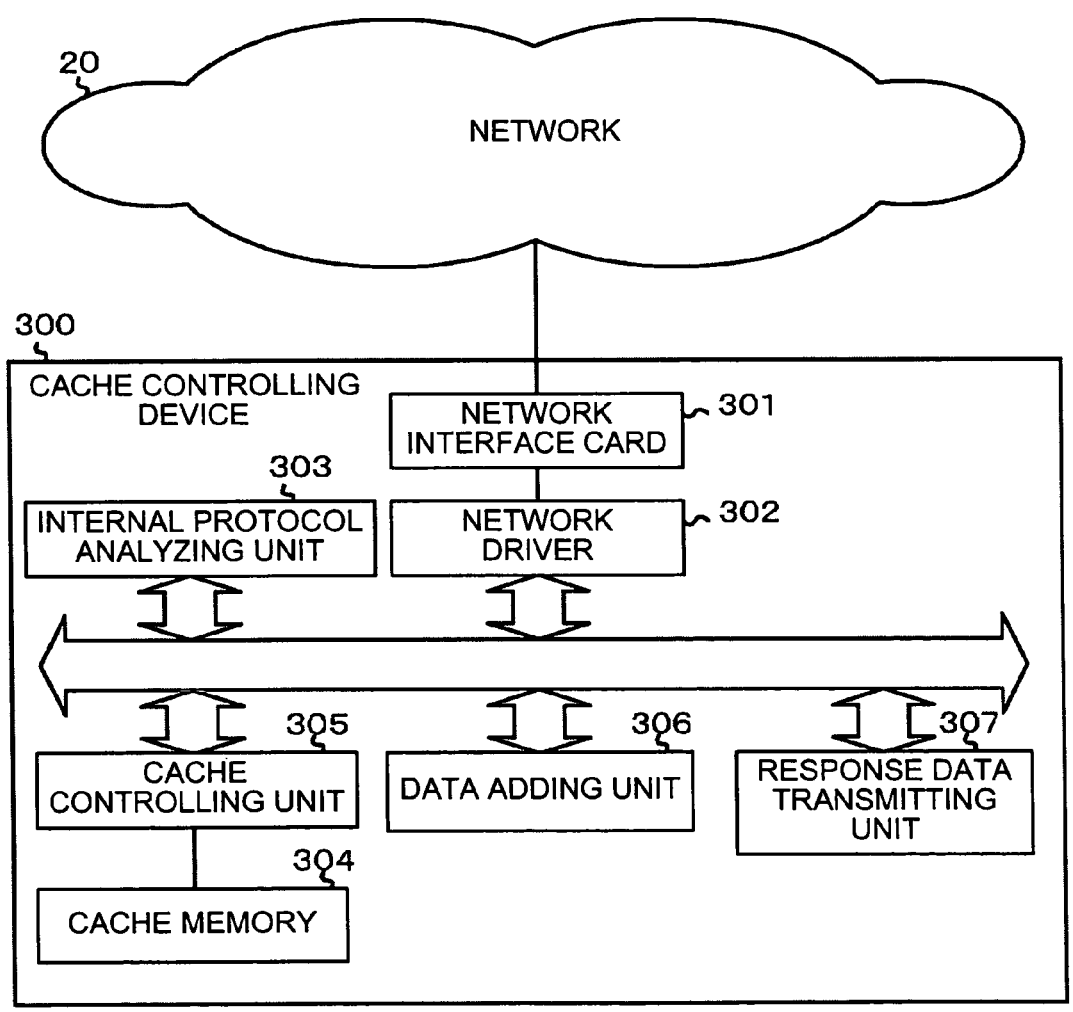
FIG. 5 is a block diagram of a configuration of a cache controlling device 300 shown in FIG. 1.

Referring to FIG. 4, the cache range is a range of a data position in the cache controlling device 300 shown in FIG. 5, and includes data of a node ID and a memory range. The node ID is an identifier to identify the node in the cache controlling device 300. The memory range is a range of the data position in a cache memory 304.

Figure 3:
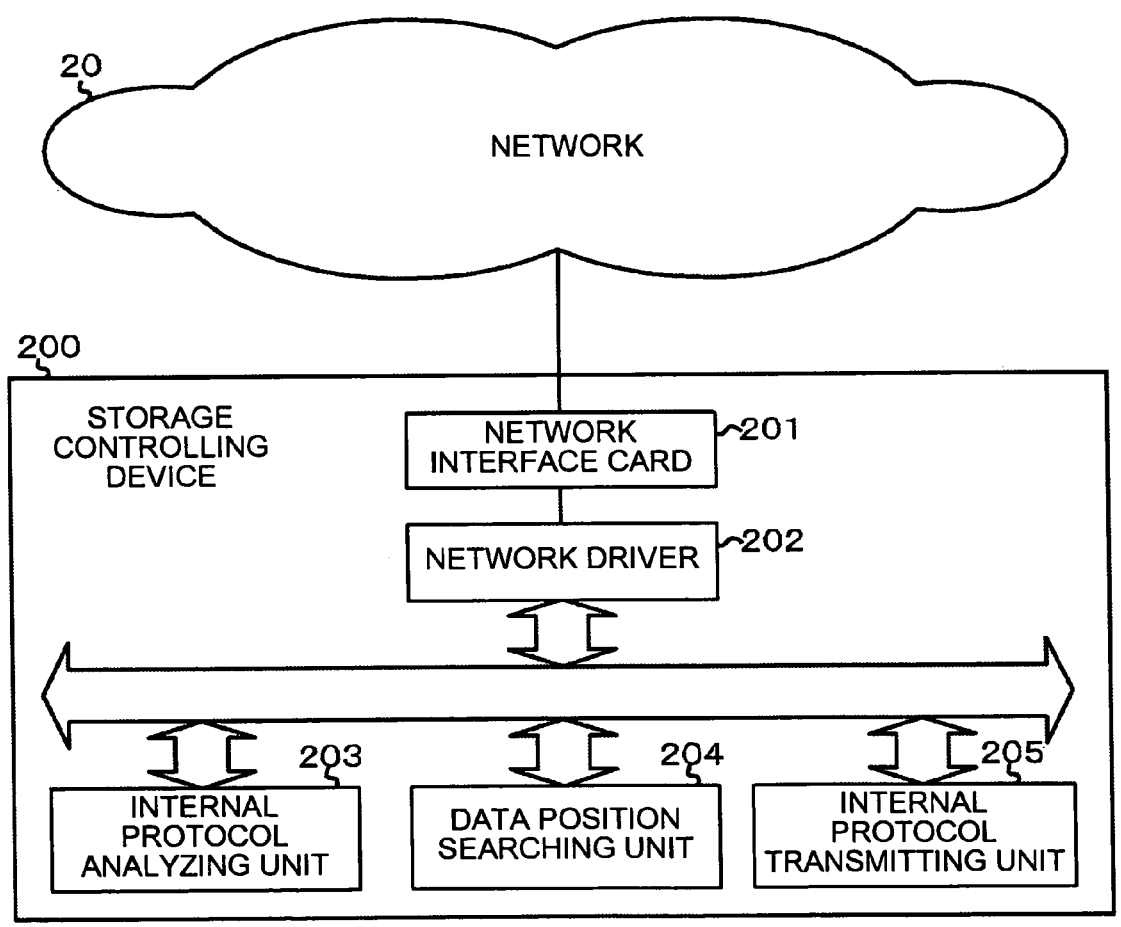
FIG. 3 is a block diagram of a configuration of a storage controlling device 200 shown in FIG. 1.

FIG. 3 is a detailed block diagram of the storage controlling device 200. The storage controlling device 200 includes a network interface card 201 that controls a communication with the protocol processing device 100 and the cache controlling device 300 in accordance with a predetermined communication protocol, and a network driver 202 that drive controls the network interface card 201.

Moreover, the storage controlling device 200 includes the internal protocol analyzing unit 203 that has a function of receiving the data 130 shown in FIG. 7C from the protocol processing device 100.

Figure 8A:
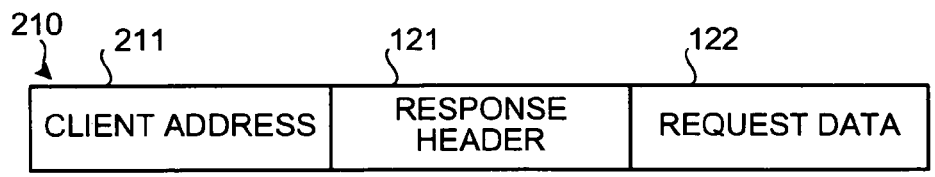
FIG. 8A is an example of data created by an internal protocol analyzing unit shown in FIG. 3.

In addition, the internal protocol analyzing unit 203 has functions of analyzing the data 130 and creating a data 210 shown in FIG. 8A.

The data 210 includes a client address 211, the response header 121 (refer to FIG. 7C), and the request data (refer to FIG. 7C). The client address 211 is an address of the client device that is included in the internal header 131 (refer to FIG. 7C).

Moreover, the storage controlling device 200 includes a data position searching unit 204 that has a function of retrieving a data position in the actual disk controlling device 400 and the cache controlling device 300 from the cache/actual disk controlling table 206 (refer to FIG. 4) using the storage ID as a key.

Figure 8B:
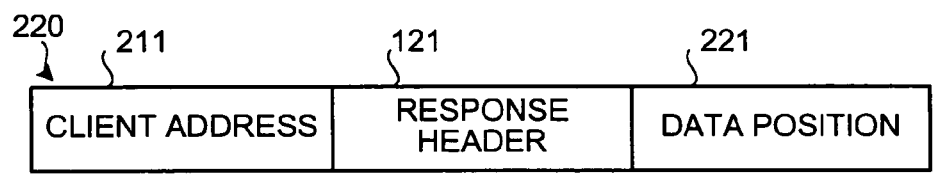
FIG. 8B is an example of data created by a data position searching unit shown in FIG. 3.

The data position searching unit 204 also has functions of creating a data 220 shown in FIG. 8B, and transmitting the data 220 to an internal protocol transmitting unit 205. The data 220 includes the client address 211 (refer to FIG. 8A), the response header 121 (refer to FIG. 8A), and a data position 221.

The data position 221 is a search result of the data position searching unit 204, and includes the actual disk range and the cache range shown in FIG. 4. If the data does not exist in the cache controlling device 300, only the actual disk range is included in the data position 221, i.e., the cache range is not included.

Figure 8C:
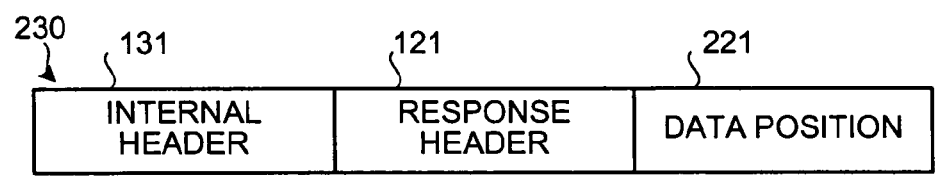
FIG. 8C is an example of data created by a an internal protocol transmitting unit shown in FIG. 3.

Moreover, the storage controlling device 200 includes the internal protocol transmitting unit 205 that has functions of creating a data 230 shown in FIG. 8C based on the data 220 (refer to FIG. 8B) from the position searching unit 204, and transmitting this data to the cache controlling device 300, which is at the subsequent stage, or the actual disk controlling device 400 (or only to the cache controlling device 300, or only to the actual disk controlling device 400).

The data 230 includes the internal header 131 (a client address, and a command type: refer to FIG. 7C), the response header 121 (refer to FIG. 8B), and the data position 221 (refer to FIG. 8B).

Figure 8D:
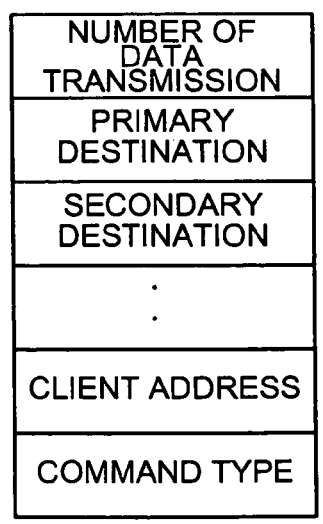
FIG. 8D is an example of an internal header.

If the data 230 is to be transmitted to the actual disk controlling device 400, the internal header 131 includes data of a number of data transmission, a primary destination, a secondary destination, . . . and a command type as shown in FIG. 8D.

The number of data transmission is the number of destination that the data should be sent to (the client device and the cache controlling device 300) when the actual disk controlling device 400 is accessed. The primary destination is an address of the client device (one of the client devices $10_1$ to $10_n$). The secondary destination is an address of the cache controlling device 300. Thus, when the actual disk controlling device 400 is accessed, the identical data is transmitted to both the client device and the cache controlling device 300 simultaneously.

Referring to FIG. 1 again, the cache controlling device 300 has functions of receiving the data 230 (refer to FIG. 8C) from the internal protocol transmitting unit 205, reading the data from the cache memory 304 (refer to FIG. 5), and writing the data to the cache memory 304 based on the data 230.

FIG. 5 is a detailed block diagram of the cache controlling device 300. The cache controlling device 300 includes a network interface card 301 that controls a communication with the storage controlling device 200, the actual disk controlling device 400, and one of the client devices $10_1$ to $10_n$ in accordance with a predetermined protocol, and a network driver 302 that drive controls the network interface card 301.

Moreover, the cache controlling device 300 includes an internal protocol analyzing unit 303 has a function of receiving the data 230 shown in FIG. 8C from the storage controlling device 200. The internal protocol analyzing unit 303 also has functions of analyzing the data 230, and creating a data 310 shown in FIG. 9A.

The data 310 includes the client address 211 (refer to FIG. 8B), the response header 121 (refer to FIG. 8C), and the data position 221 (refer to FIG. 8C).

Figure 6:
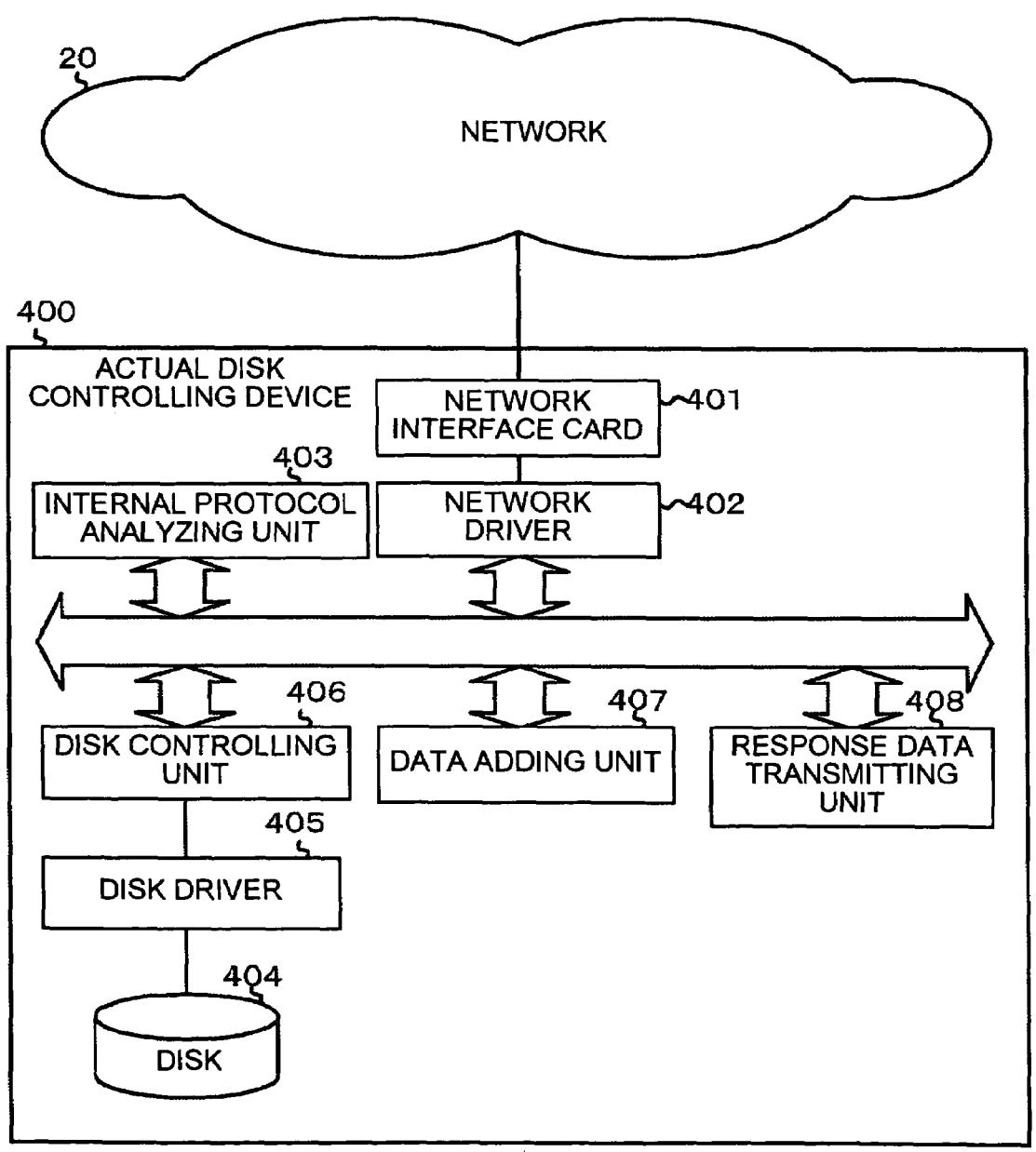
FIG. 6 is a block diagram of a configuration of an actual disk controlling device 400 shown in FIG. 1.

Moreover, the cache controlling device 300 includes the cache memory 304 that is, for example, an SRAM, and has characteristics that the access time is shorter and the capacity is smaller than that of the disk 404 (refer to FIG. 6).

A part of the data that is stored in the disk 404 is also stored in the cache memory 304. A storage condition of the cache memory 304 and the disk 404 are managed with the cache/actual disk controlling table 206 (refer to FIG. 4)

described previously. The cache controlling unit 305 controls an access to the cache memory 304.

Moreover, the cache controlling device 300 includes a data adding unit 306 that adds, when the command is a read command, the data read from the cache memory 304 as a response data 321 to the client address 211 and the response header 121 to create a data 320 (see FIG. 9B), and transmits this data to a response data transmitting unit 307.

Figure 9A:
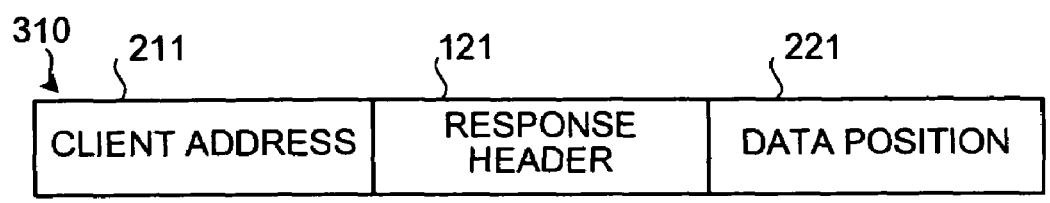
FIG. 9A is an example of data created by an internal protocol analyzing unit shown in FIG. 5.
Figure 9B:
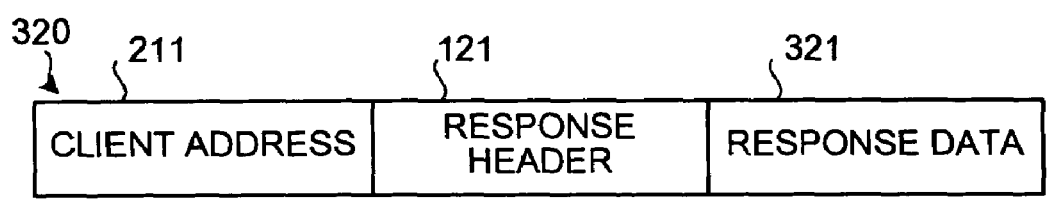
FIG. 9B is an example of data created by an adding unit shown in FIG. 5.
Figure 9C:
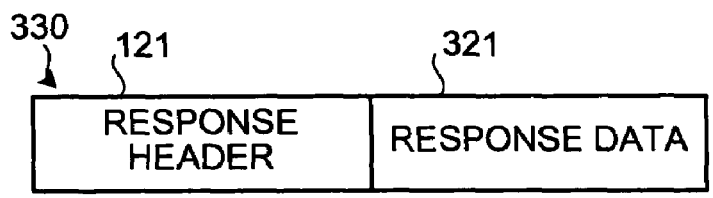
FIG. 9C is an example of data transmitted by a response data transmitting unit shown in FIG. 5.

The response data transmitting unit 307 has a function of transmitting a data 330 shown in FIG. 9C to the client address that is included in the internal header 131 (refer to FIG. 8C). The data 330 includes the response header 121 (refer to FIG. 9B) and a response data 321 (refer to FIG. 9B).

Referring to FIG. 1, the actual disk controlling device 400 has functions of receiving the data 230 (refer to FIG. 8C and 8D) from the storage controlling device 200, reading a data from the disk 404 (refer to FIG. 6), and writing a data to the disk 404 based on the data 230.

FIG. 6 is a detailed block diagram of the actual disk controlling device 400. The actual disk controlling device 400 includes a network interface card 401 that controls a communication with the storage controlling device 200, the cache controlling device 300, one of the client devices $10_1$ to $10_n$, and the like in accordance with the predetermined protocol, and a network driver 402 that drive controls the network interface card 401.

Moreover, the actual disk controlling device 400 includes an internal protocol analyzing unit 403 that has a function of receiving the data 203 shown in FIGS. 8C and 8D from the storage controlling device 200. The internal protocol analyzing unit 403 also has functions of analyzing the data 230 and creating a data 410 shown in FIG. 10A.

The data 410 includes the client address 211, the response header 121 (refer to FIG. 8C), and the data position 221 (refer to FIG. 8C). The client address 211 corresponds with the primary destination shown in FIG. 8D.

Moreover, the actual disk controlling device 400 includes the disk 404 that is a storage medium that has characteristics of having a higher capacity and of being slower in terms of an access time than that of the cache memory 304 (refer to FIG. 5), a disk driver 405 that drive controls the disk 404, and a disk controlling unit 406 that executes read/write control of a data from and to the disk 404.

Figure 10A:
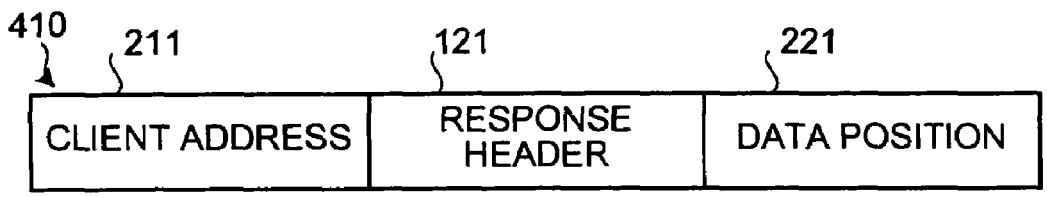
FIG. 10A is an example of data created by an internal protocol analyzing unit shown in FIG. 6.
Figure 10B:
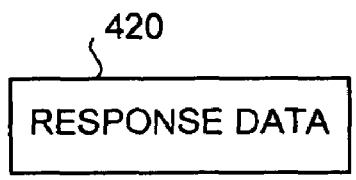
FIG. 10B is an example of data created by a disk controlling unit shown in FIG. 6.

Specifically, when reading data, the disk controlling unit 406 reads the data from the predetermined position in the disk 404 based on the data position 221 in the data 410 shown in FIG. 10A, and treat this data as a response data 420 shown in FIG. 10B.

Figure 10C:
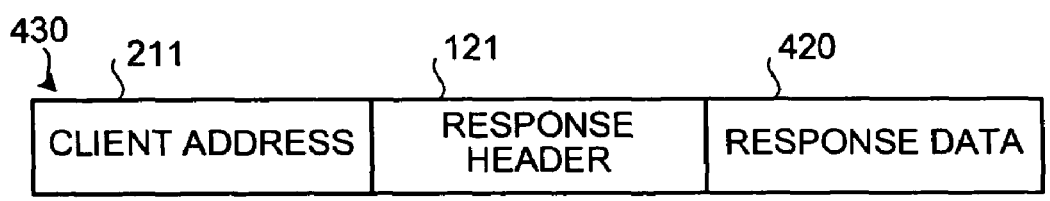
FIG. 10C is an example of data created by a data adding unit shown in FIG. 6.

Moreover, the actual disk controlling device 400 includes a data adding unit 407 that adds the response data 420 (refer to FIG. 10B) to the client address 211 and the response header 121 shown in FIG. 10A to create a data 430 shown in FIG. 10C. The data adding unit 407 also transmits the data 430 to a response data transmitting unit 408.

The response data transmitting unit 408 transmits a data 440 (refer to FIG. 10D) to the client address that is included in the data 430 (refer to FIG. 10C) from the data adding unit 407.

Moreover, the response data transmitting unit 408 transmits the data 440 also to the secondary destination (the cache controlling device 300) shown in FIG. 8D.

Figure 11:
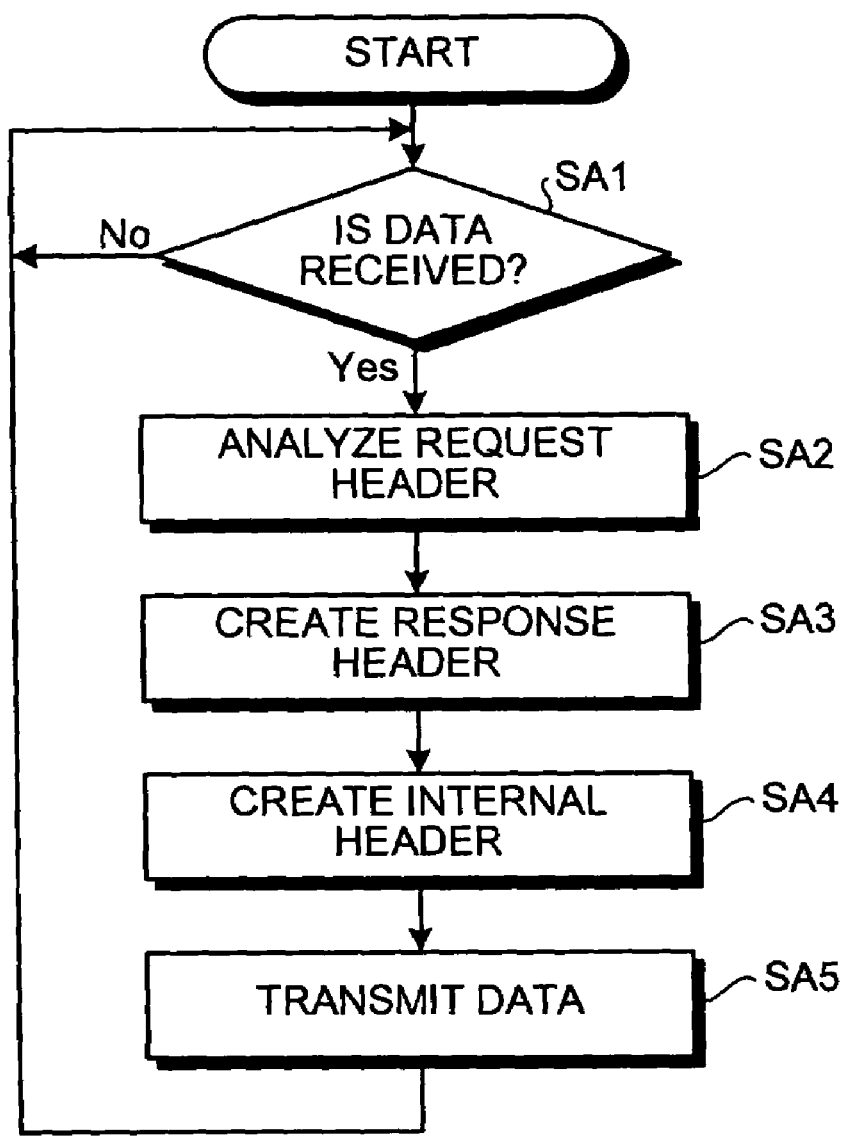
FIG. 11 is a flowchart for explaining an operation of the protocol processing device 100 shown in FIG. 1.
Figure 12:
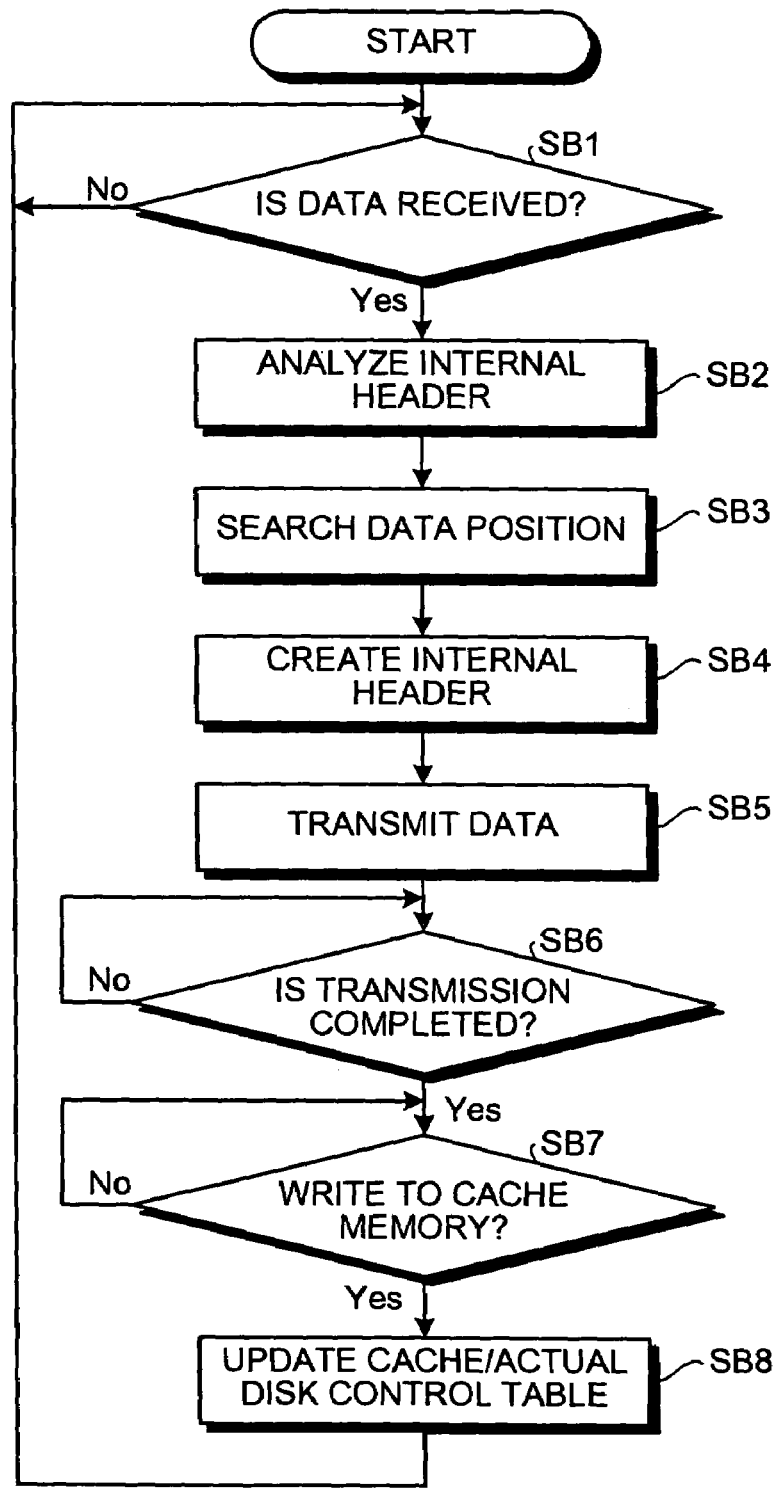
FIG. 12 a flowchart for explaining an operation of the storage controlling device 200 shown in FIG. 1.
Figure 13:
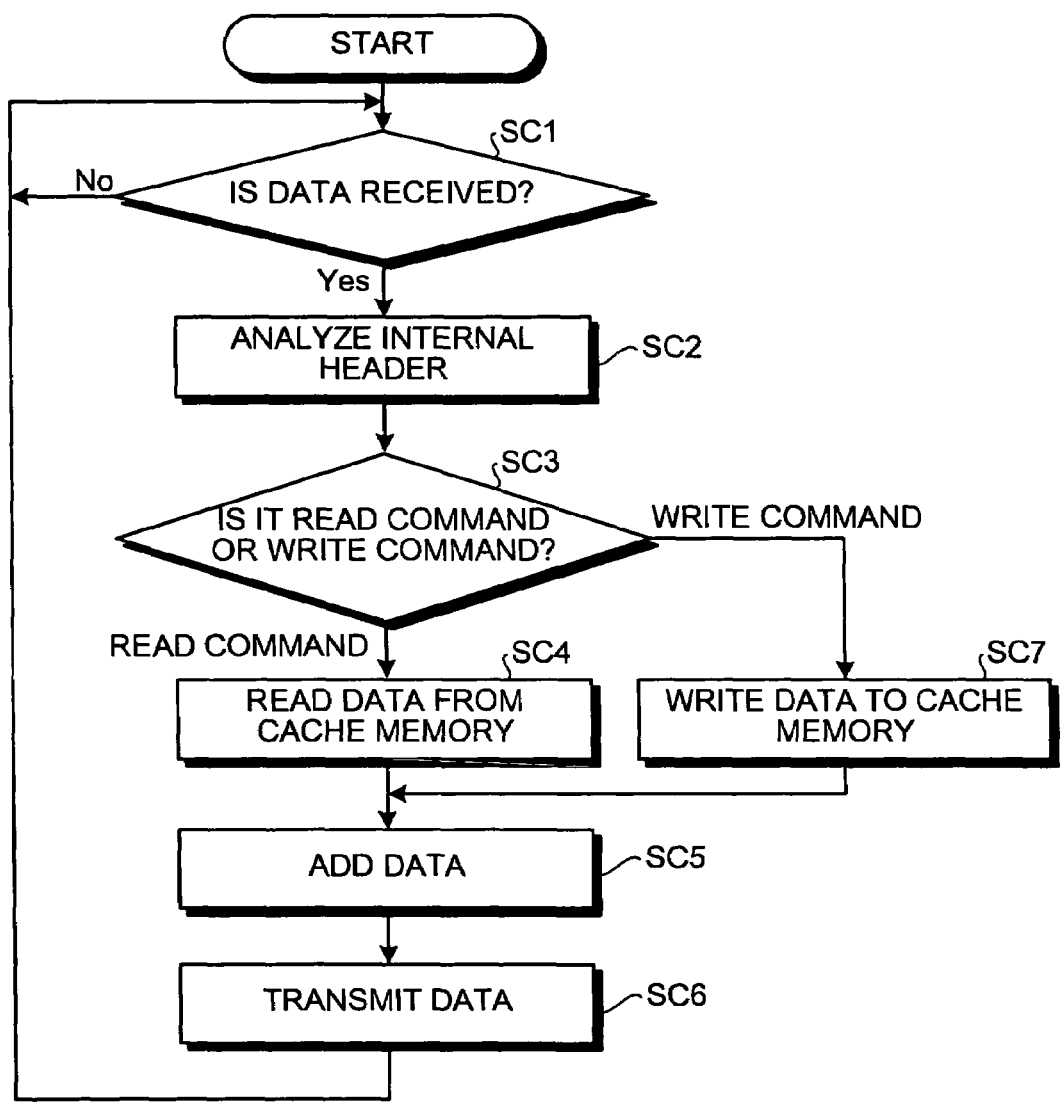
FIG. 13 is a flowchart for explaining an operation of the cache controlling device 300 shown in FIG. 1.
Figure 14:
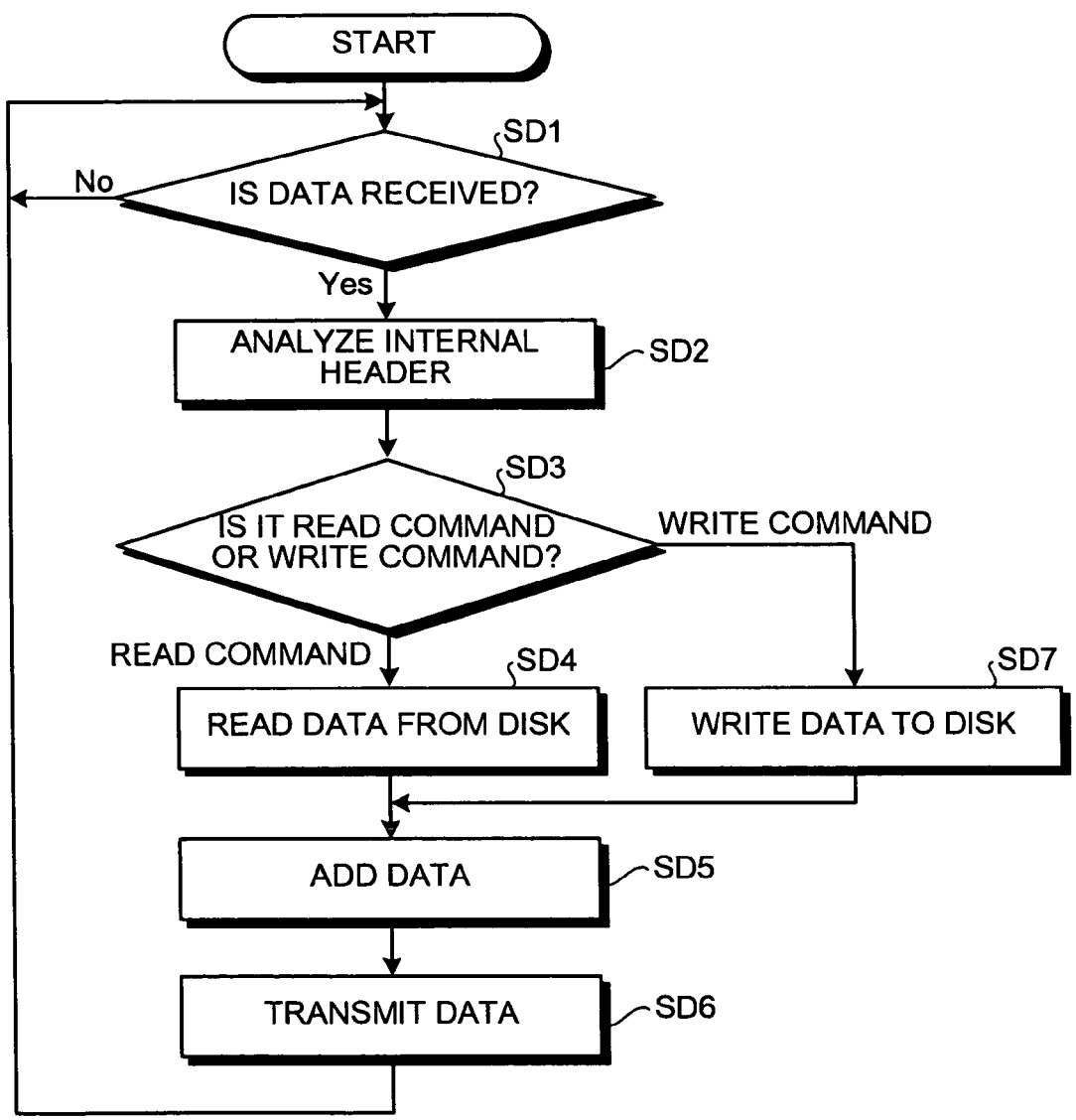
FIG. 14 is a flowchart that explains an operation of the actual disk controlling device 400.

An operation of an embodiment is explained below with reference to flowcharts shown in FIGS. 11 to 14. FIG. 11 is a flowchart for explaining an operation of the protocol processing device 100 shown in FIG. 1. FIG. 12 is a flowchart for explaining an operation of the storage controlling device 200 shown in FIG. 1. FIG. 13 is a flowchart for explaining an operation of the cache controlling device 300 shown in FIG. 1. FIG. 14 is a flowchart for explaining an operation of the actual disk controlling device 400.

At step SA1 shown in FIG. 11, the external protocol processing unit 103 in the protocol processing device 100 shown in FIG. 2 determines whether the data 110 shown in FIG. 7A is received from one of the client devices $10_1$ to $10_n$ (refer to FIG. 1). At this stage, the result of determination be shall be "No", and the step SA1 is repeated.

At step SB1 shown in FIG. 12, the internal protocol analyzing unit 203 in the storage controlling device 200 shown in FIG. 3 determines whether the data 130 shown in FIG. 7C is received from the protocol processing device 100. At this stage, the result of determination be shall be "No", and the step SB1 is repeated.

At step SC1 shown in FIG. 13, the internal protocol analyzing unit 303 in the cache controlling device 300 shown in FIG. 5 determines whether the data 230 shown in FIG. 8C is received from the storage controlling device 200. At this stage, the result of determination be shall be "No", and the step SC1 is repeated.

At step SD1 shown in FIG. 14, the protocol analyzing unit 403 in the actual disk controlling device 400 shown in FIG. 6 determines whether the data 230 shown in FIG. 8C is received from the storage controlling device 200. At this stage, the result of determination be shall be "No", and the step SD1 is repeated.

The data 110 (refer to FIG. 7A) for a read operation is transmitted by, for example, the client device $10_1$ to the protocol processing device 100, the data 110 is received, via the network 20, by the protocol processing device 100 shown in FIG. 2. In this case, because the data is for the read operation, the command type that is included in the request header 111 (refer to FIG. 7A) is a read command.

When the data 110 is received, the result of the determination at the step SA1 shown in FIG. 11 shall be "Yes". At step SA2, the external protocol processing unit 103 analyzes the request header 111 in the data 110 shown in FIG. 7A. At step SA3, the external protocol processing unit 103 creates the response header 121 shown in FIG. 7B, and passes the data 120 to the internal protocol processing unit 104.

At step SA4, the internal protocol processing unit 104 creates the internal header 131 shown in FIG. 7C. At step SA5, the internal protocol processing unit 104 transmits the data 130 shown in FIG. 7C, via the network 20, to the storage controlling device 200.

When the storage controlling device 200 shown in FIG. 3 receives the data 130, the result of the determination at step SB1 shown in FIG. 12 shall be "Yes". At step SB2, the internal protocol analyzing unit 203 analyzes the internal header 131 shown in FIG. 7C and passes the data 210 shown in FIG. 8A to the data position searching unit 204.

At step SB3, the data position searching unit 204 retrieves a cache range from the cache/actual disk controlling table 206 shown in FIG. 4 using the storage ID that is included in the request data 122 (refer to FIG. 8A) as a key. If the cache range is retrieved, the data position searching unit 204 creates the data 220 (refer to FIG. 8B) that includes the data position 211 (refer to FIG. 8B), which is a search result, and passes this data to the internal protocol transmitting unit 205.

At step SB4, the internal protocol transmitting unit 205 creates the data 230 shown in FIG. 8C. At step SB5, the internal protocol transmitting unit 205 transmits the data 230, via the network 20, to the cache controlling device 300.

At step SB6, the internal protocol transmitting unit 205 determines whether the transmission of the data 230 is completed. At this stage the result of the determination shall be "No", and the step SB6 is repeated.

If the transmission of the data 230 is completed, the result of the determination at step SB6 shall be "Yes". At step SB7, the internal protocol transmitting unit 205 determines whether to write the data to the cache memory 304 (refer to FIG. 5). At this stage the result of the determination shall be "No", and the step SB7 is repeated.

If the cache controlling device 300 receives the data 230, the internal protocol analyzing unit 303 the result of the determination at step SC1 shown in FIG. 13 shall be "Yes". At step SC2, the internal protocol analyzing unit 303 analyzes the internal header 131 shown in FIG. 8C, and creates the data 310 shown in FIG. 9A.

At step SC3, the internal protocol analyzing unit 303 determines the command type, i.e., whether the command is a read command or a write command, based on the result of the analysis at the step SC2. Because it is assumed here that the command is a read command, at step SC4, the internal protocol analyzing unit 303 passes the data 310 (refer to FIG. 9A) to the cache controlling unit 305, and directs to read the data from the cache memory 304.

Then, the cache controlling unit 305 reads data from the cache memory 304 based on the data position 221 (refer to FIG. 9A). At step SC5, the data adding unit 306 adds the response data 321 shown in FIG. 9B to the client address 211 and the response header 121 to create the data 320. Then, the data adding unit 306 transmits the data 320 to the response data transmitting unit 307.

At step SC6, the response data transmitting unit 307 creates the data 330 shown in FIG. 9C, and transmits the created data to the client device $10_1$. When the client 101 receives the data 330, the read operation of the data read by the cache controlling device 300 is completed.

Moreover, when only the actual disk range is retrieved from the cache/actual disk controlling table 206 shown in FIG. 4 by the data position searching unit 204 using the storage ID that is included in the request data 122 (refer to FIG. 7C) at the step SB3 shown in FIG. 12, the process described below is executed. That is, the data position searching unit 204 creates the data 220 (refer to FIG. 8B) that includes the data position 211 (refer to FIG. 8B), which is a search result, and passes this data to the internal protocol transmitting unit 205.

At step SB4, the internal protocol transmitting unit 205 creates the internal header 131 of the data 230 shown in FIG. 8C. The internal header 131 has the structure shown in FIG. 8D. At step SB5, the internal protocol transmitting unit 205 transmits the data 230, via the network 20, to the actual disk controlling device 400.

At step SB6, the internal protocol transmitting unit 205 determines whether the transmission of the data 230 is completed. At this stage, the result of the determination shall be "No", and the step SB6 is repeated.

At step SB7, the internal protocol transmitting unit 205 determines whether to write the data to the cache memory 304 (refer to FIG. 5). At this stage, the result of the determination shall be "Yes" because the internal header will, be the internal header 131 shown in FIG. 8D. At step SB8, the internal protocol transmitting unit 205 updates the cache/actual disk controlling table 206 (refer to FIG. 4) corresponding to the write operation because the data is written to the cache memory 304 as described below.

When the actual disk controlling device 400 shown in FIG. 6 receives the data 230, the result of the determination at step SD1 shown in FIG. 14 shall be "Yes". At step SD2, the internal protocol analyzing unit 403 analyzes the internal header 131 shown in FIG. 8D, and creates the data 410 shown in FIG. 10A.

At step SD3, the internal protocol analyzing unit 403 determines the command type, i.e., whether the command is a read command or a write command, based on the analysis result at the step SD2. Because the command is a read command, at step SD4, the internal protocol analyzing unit 403 passes the data 410 (refer to FIG. 10A) to the disk controlling unit 406, and directs to read the data from the disk 404.

Then, the disk controlling unit 406 reads data from the disk 404 based on the data position 221 (refer to FIG. 10A). At step SD5, the data adding unit 407 adds the response data 420 shown in FIG. 10B to the client address 211 and the response header 121 to create the data 430 shown in FIG. 10C. Then, the data adding unit 407 transmits the data 430 to the response data transmitting unit 408.

Figure 10D:
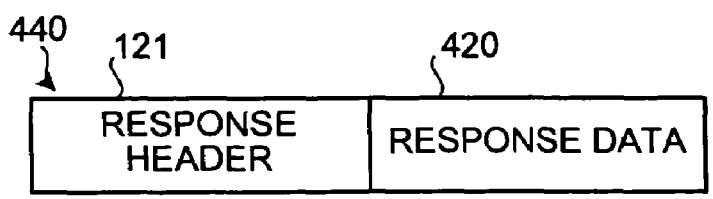
FIG. 10D is an example of data transmitted by a response data transmitting unit shown in FIG. 6.

At step SD6, the response data transmitting unit 408, after creating the data 440 shown in FIG. 10D, transmits the data 440 to both the primary destination (i.e., the client $10_1$) and the secondary destination (i.e., the cache controlling device 300) shown in the internal header in FIG. 8D. When the client $10_1$ receives the data 440, the read operation of the data by the actual disk controlling device 400 is completed.

Moreover, when the cache controlling device 300 shown in FIG. 5 receives the data 440, the cache controlling unit 305 writes the response data 420 to the cache memory 304. Consequently, because the same response data 420 exists both in the actual disk controlling device 400 and the cache controlling device 300, the data can be read from the cache controlling device 300 at the next reading.

When the data 110 (refer to FIG. 7A) for a write operation is transmitted to the protocol processing device 100 from, for example, the client device $10_1$, the data 110 is received, via the network 20, by the protocol processing device 100 shown in FIG. 2. In this case, because the data is for the write operation, the command type included in the request header 111 (refer to FIG. 7A) is a write command.

Then, the result of the determination at the step SA1 shown in FIG. 11 shall be "Yes". Then, the processes at the steps SA2 to SA4 described previously are executed. At step SA5, the internal protocol processing unit 104 transmits the data 130 shown in FIG. 7C to the storage controlling device 200.

When the storage controlling device 200 shown in FIG. 3 receives the data 130, the result of the determination at step SB1 shown in FIG. 12 shall be "Yes". Then, the processes at the steps SB2 to SB4 described previously are executed.

At the step SB5, the internal protocol transmitting unit 205 transmits the data 230, via the network 20, to the actual disk controlling device 400. The internal header 131 in the data 230 has the structure shown in FIG. 8D.

At the step SB6, the internal protocol transmitting unit 205 determines whether the transmission of the data 230 is completed. At this stage, the result of the determination shall be "No", and the step SB2 is repeated. When the transmission of the data 230 is completed, the result of the determination at the step SB6 shall be "Yes".

At the step SB7, the internal protocol transmitting unit 205 determines whether to write the data to the cache memory 304 (refer to FIG. 5). In this case, the result of the determination shall be "Yes" because the internal header is the internal header 131 shown in FIG. 8D. At the step SB8, the internal protocol transmitting unit 205, updates the cache/actual disk controlling table 206 (refer to FIG. 4)

relating to the write because the data is written to the cache memory 304 as described below.

When the actual disk controlling device 400 shown in FIG. 6 receives the data 230, the result of the determination at the step SD1 shown in FIG. 14 shall be "Yes". At the step SD2, the internal protocol analyzing unit 403 analyzes the internal header 131 shown in FIG. 8D, and creates the data 410 shown in FIG. 10A.

At the step SD3, the internal protocol analyzing unit 403 determines the command type, i.e., whether the command is a read command or a write command, from the result of the analysis at the step SD2. In this case, since the command is a write command, at the step SD7, the internal protocol analyzing unit 403 passes the data 410 (refer to FIG. 10A) to the disk controlling unit 406, and directs to write the data from the disk 404.

Then, the disk controlling unit 406 writes data in the disk 404 based on the data position 221 (refer to FIG. 10A). At the step SD5, the data adding unit 407 adds the response data 420 shown in FIG. 10B to the client address 211 and the response header 121 to create the data 430 shown in FIG. 10C. Then, the data adding unit 407 transmits the data 430 to the response data transmitting unit 408.

At the step SD6, the response data transmitting unit 408, after creating the data 440 shown in FIG. 10D, transmits the data 440 to both the primary destination (i.e., the client 10$_1$) and the secondary destination (i.e., the cache controlling device 300) shown in the internal header in FIG. 8D. When the client 10$_1$ receives the data 440, write operation of the data by the actual disk controlling device 400 is completed.

Moreover, when the cache controlling device 300 shown in FIG. 5 receives the data 440, the cache controlling unit 305 writes the response data 420 (the same data that is written into the disk 404) to the cache memory 304. Consequently, because the same response data 420 exists both in the actual disk controlling device 400 and the cache controlling device 300, the data can be read from the cache controlling device 300 at the next reading.

As explained above, according to the embodiment, the protocol processing device 100, the storage controlling device 200, the cache controlling device 300, and the actual disk controlling device 400 are providedprepared decentrally on the network 20 to operate controls independently from each other, the cache memory 304 shown in FIG. 5 can be used exclusively within the cache controlling device 300. Therefore, the memory area for use increases so that the cache hit rate can be increased and the access speed to a data can be improved.

Although the embodiment according to the present invention has been explained in details with reference to the drawings, specific configuration examples are not limited to this one embodiment, and modifications in design and the like without departing from the scope of the invention can be included within the present invention.

Figure 15:
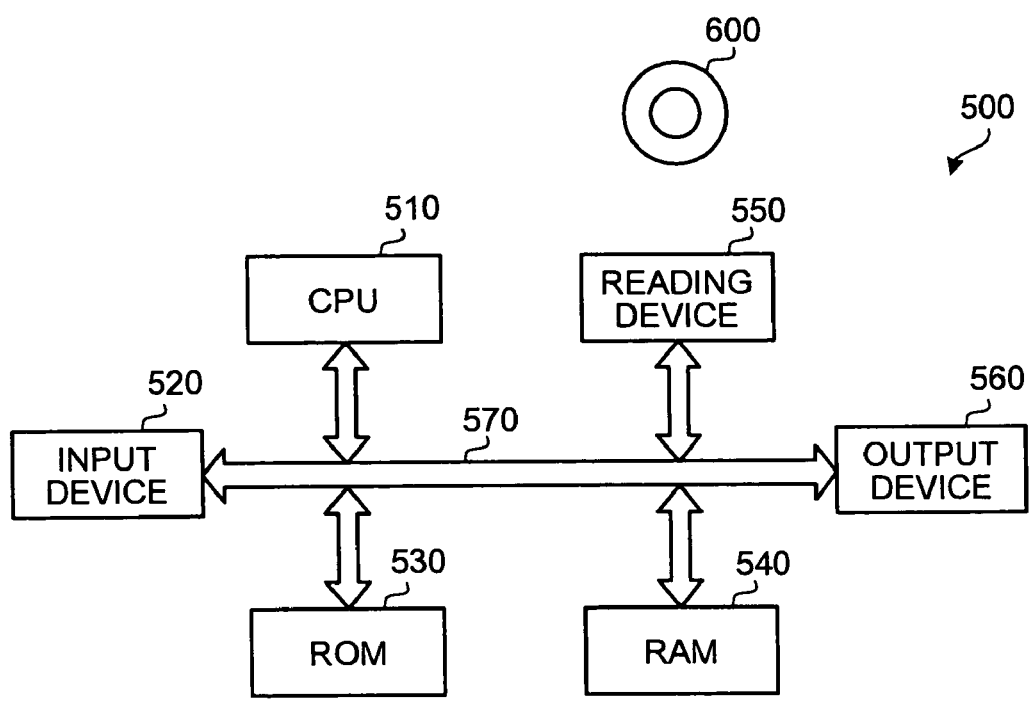
FIG. 15 is a block diagram of a configuration of a variation of the same embodiment.

For example, in the embodiment described above, a program to realize each function of the protocol processing device 100, the storage controlling device 200, the cache controlling device 300, and the actual disk controlling device 400 my be prepared inside a storage medium 600 shown in FIG. 15 that can be read by a computer 500 shown in the same figure to achieve each function by executing the program.

The computer 500 shown in the same figure includes a CPU (Central Processing Unit) 510, an input unit 520 such as a keyboard and a mouse, a ROM (Read Only Memory) 530 that stores various data, RAM (Random Access Memory) 540 that stores operation parameters and the like, a reading device 550 that reads a program from the storage medium 600, an output device 560 such as a display or a printer, and a bus 570 to connect each device.

The CPU 510 achieves each function described previously by executing the program after reading the program that is stored in the storage medium 600 through the reading device 550. The storage medium 600 includes a storage medium such as an optical disk, a flexible disk, and a hard disk.

Furthermore, in the embodiment, a case that the same data is transmitted to several devices (for example, the client device, the cache controlling device 300, and the like) with the internal header 131 shown in FIG. 8D from the actual disk controlling device 400 has been explained, the same data can be transmitted to several devices with the internal header 131 from the cache controlling device 300.

As explained above, according to the present invention, the memory area for use can be increased so that the cache hit rate increase and the access speed to a data improves. It becomes possible to eliminate needless data transfers and to improve the access speed further. It becomes possible to duplicate the data so that the system becomes more reliable. It becomes possible to duplicate the data for high-speed access. It becomes possible to duplicate the data so that the system becomes more reliable.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage system comprising:
    a cache controlling device that includes a cache memory as a high-speed-access storage medium, a cache controlling unit that controls access to the cache memory, a first network interface device that is connected to a network and controls communication through the network, and a first network driver that controls the first network interface device;
    a disk controlling device that including a disk as a high-capacity storage medium, a disk controlling unit that executes read/write control of data from and to the disk, a second network interface device that is connected to the network and controls communication through the network, and a second network driver that controls the second network interface device; and
    a control device that includes a third network interface device that is connected to the network and controls communication through the network, and a third network driver that controls the third network interface device, the control device being configured to accept an access request from a client device and makes the cache controlling device and the disk controlling device execute a process corresponding to the access request, wherein
    the cache controlling device, the disk controlling device, and the control device are decentralized on the network, and
    wherein the control device is configured to transmit a control data through the network to any one of the cache controlling device and the disk controlling device upon receiving the access request, the cache controlling device is configured to access the cache memory and to transmit an access result, via the first network interface device, directly to the client device through the network, and the disk controlling device is configured to access the disk and to transmit an access result, via the second network interface device, directly to the client device through the network.

2. The storage system according to claim 1, wherein the control device transmits a control data to the disk controlling device upon receiving the access request, and the disk controlling device transmits an access result to a plurality of destinations based on the control data.

3. The storage system according to claim 2, wherein the destinations are the client device and the cache controlling device, and the cache controlling device stores the access result in the cache memory.

4. The storage system according to claim 1, wherein the control device transmits a control data to the cache controlling device upon receiving the access request, and the cache controlling device transmits an access result to a plurality of destinations based on the control data.

5. A computer-readable storage medium having recorded therein a storage control program that is executed on a storage system, the storage system comprising a cache controlling device that includes a cache memory as a high-speed-access storage medium, a cache controlling unit that controls access to the cache memory, a first network interface device that is connected to a network and controls communication through the network, and a first network driver that controls the first network interface device, a disk controlling device that includes a disk as a high-capacity storage medium, a disk controlling unit that executes read/write control of data from and to the disk, a second network interface device that is connected to the network and controls communication through the network, and a second network driver that controls the second network interface device, and a control device that includes a third network interface device that is connected to the network and controls communication through the network, and a third network driver that controls the third network interface device, the control device being configured to accept an access reguest from a client device and make the cache controlling device and the disk controlling device execute a process corresoonding to the access request, the cache controlling device, the disk controlling device and the control device decentralized on the network, the storage control program making a computer realize:

accepting an access request from a client device;

creating a control data that makes the cache controlling device and the disk controlling device execute a process corresponding to the access request; and transmitting the control data to any one of the cache controlling device and the disk controlling device, wherein the control data is a data that directs the cache controlling device to access the cache memory and to transmit an access result, via the first network interface device, directly to the client device through the network, and the disk controlling device to access the disk, and to transmit an access result, via the second network interface device, directly to the client device through the network.

6. The computer-readable storage medium according to claim 5, wherein the control data is a data that directs the disk controlling device to transmit the access result to a plurality of destinations.

7. The computer-readable storage medium according to claim 5, wherein the control data is a data that directs the cache controlling device to transmit the access result to a plurality of destinations.

8. A storage control method that is performed on a storage system, the storage system comprising a cache controlling device that includes a cache memory as a high-speed-access storage medium, a cache controlling unit that controls access to the cache memory, a first network interface device that is connected to a network and controls communication through the network, and a first network driver that controls the first network interface device, a disk controlling device that includes a disk as a high-capacity storage medium, a disk controlling unit that executes read/write control of data from and to the disk, a second network interface device that is connected to the network and controls communication through the network, and a second network driver that controls the second network interface device, and a control device that includes a third network interface device that is connected to the network and controls communication through the network, and a third network driver that controls the third network interface device, the control device being configured to accept an access request from a client device and make the cache controlling device and the disk controlling device execute a process corresponding to the access request, the cache controlling device, the disk controlling device and the control device being decentralized on the network, comprising:

accepting an access request from a client device;

creating a control data that makes the cache controlling device and the disk controlling device execute a process corresponding to the access request; and transmitting the control data to any one of the cache controlling device and the disk controlling device, wherein the control data is data that directs the cache controlling device to access the cache memory and to transmit an access result, via the first network interface device, directly to the client device through the network, and the disk controlling device to access the disk, and to transmit an access result, via the second network interface device, directly to the client device through the network.

* * * * *

UNITED STATES PATENT AND TRADEMARK OFFICE
CERTIFICATE OF CORRECTION

| | |
|---|---|
| PATENT NO. | : 7,343,448 B2 |
| APPLICATION NO. | : 10/871002 |
| DATED | : March 11, 2008 |
| INVENTOR(S) | : Takashi Watanabe et al. |

It is certified that error appears in the above-identified patent and that said Letters Patent is hereby corrected as shown below:

Column 12, Line 53, change "makes" to --make--.

Column 13, Line 38, change "reguest" to --request--.

Column 13, Line 40, change "corresoonding" to --corresponding--.

Column 13, Line 42, before "decentralized" insert --being--.

Column 14, Line 1, after "disk" delete ",".

Column 14, Line 48, after "disk" delete ",".

Signed and Sealed this

Twenty-ninth Day of July, 2008

JON W. DUDAS
*Director of the United States Patent and Trademark Office*